United States Patent Office 3,627,506
Patented Dec. 14, 1971

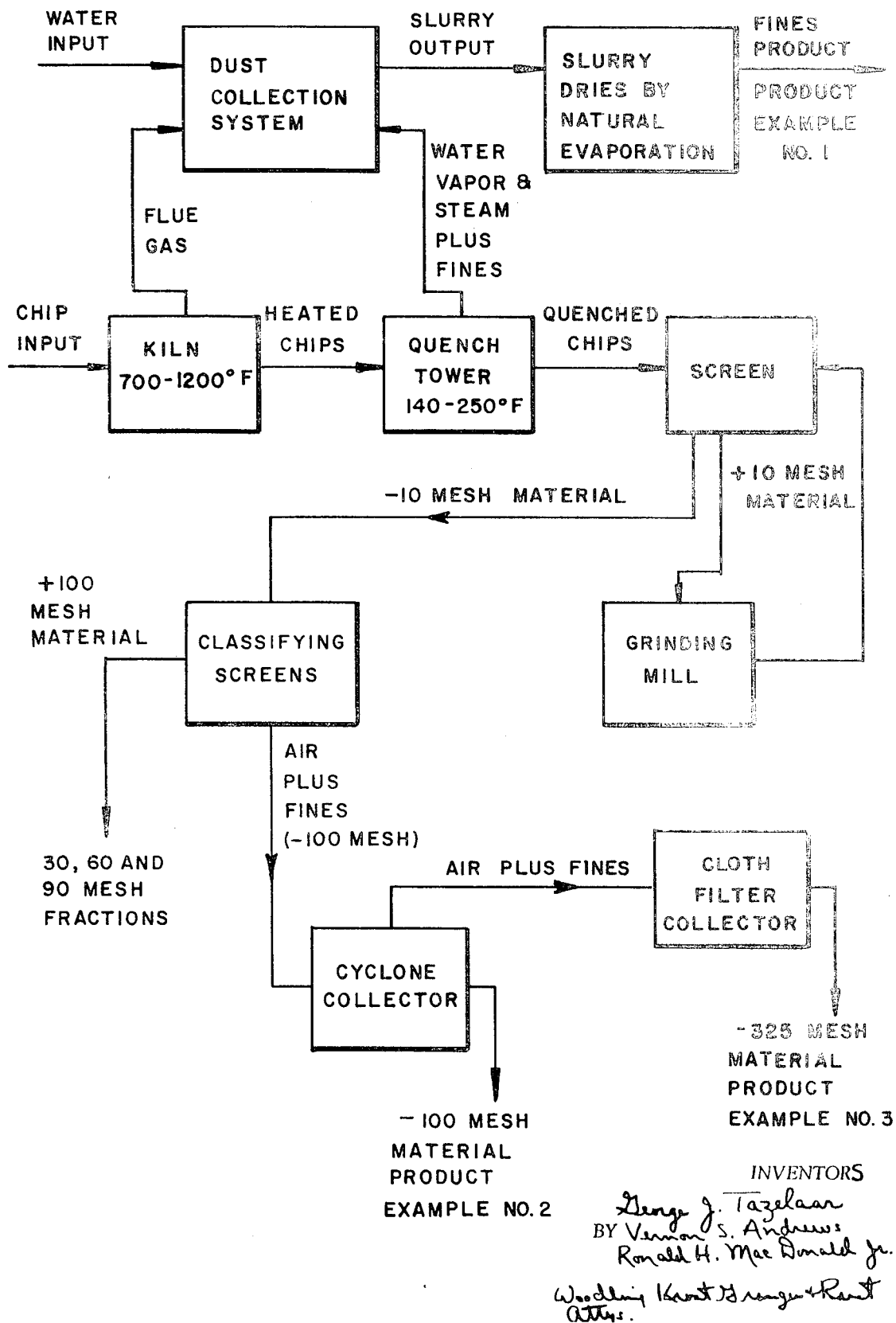

1

3,627,506
METHOD OF TREATING PLANTS WITH FINELY
DIVIDED FERRUGINOUS MATERIAL
George J. Tazelaar, Rocky River, Vernon S. Andrews,
South Euclid, and Ronald H. MacDonald, Jr., Novelty,
Ohio, assignors to Martin Marietta Corporation
Filed May 1, 1970, Ser. No. 33,552
Int. Cl. C05 9/02
U.S. Cl. 71—1
15 Claims

ABSTRACT OF THE DISCLOSURE

A method of treating plants or the soil bearing the plants by means of the addition of a ferruginous materail to prevent or overcome an iron deficiency in the soil. The method comprises adding to the soil a finely divided material from cast iron chips which chips are pre-treated by heating to a temperature on the order of at least 700° F. to 1200° F. and are then quenched in water. This addition results in a very significant benefication of the soil and plants therein substantially obviating the existence of iron deficiency in the plants growing therein.

---

The present invention relates to the use of ferruginuous dust compositions manufactured by a particular, controlled operation for preventing and correcting iron chlorosis and for supplying other values to growing plants.

The use of iron in the elemental state, or in any of several chemical combinations to benefit iron-deficient plants, is known in the art. In order to produce some degree of beneficiation, it is necessary that a composition be of itself of a suitable nature, or be capable of interacting with agents in the soil so as to convert it into materials of a suitable nature, which the plant may assimilate and metabolize. Such materials may range from elemental iron and hydrous or anhydrous oxides of iron having exceedingly small solubilities in water, to various iron chelates having relatively large solubilities in water. Lesser amounts of other elements, free or combined, known in the art as secondary and micro nutrients, may be fortuitously present or deliberately added.

The degree of beneficiation of iron deficient plants, or of soil deficient in available iron, will depend not only on the nature of the agents employed but also on their manner of application, which may reflect the purpose for which they are employed. Thus, at one extreme, a water-soluble agent may be sprayed as an aqueous solution directly on the leaves of an afflicted plant. An example of such a foliar agent would be an iron chelate, and rapid, dramatic improvement of the plant normally results thereafter. In such cases, the intent is to achieve only a short-term improvement of particular plants, rather than to improve the soil as such. At the other extreme, are agents which are only very slightly soluble in water, such as elemental iron and various oxides of iron, which are added to the surface, or intermixed within, the soil, so as to impart a lasting improvement to the soil as such. Such agents may improve the soil not only throughout the growing season during which they are applied, but also, without further additions, for one or more seasons thereafter. The agents of this invention belong to this latter category.

The present invention lies in the discovery of an unexpected degree of beneficiation of iron-deficient soil by a particular kind of ferruginous material. Logically, this unexpected effect must relate to the composition of the material; yet, the chemical analysis thereof, in relation to the chemical analyses of other agents known to the art, does not provide a full explanation of the unexpectedly improved effects observed. A further factor which makes it difficult to fully relate the improved results observed to composition of the ferruginous material is that the beneficial effects remain relatively constant when the relative proportions of the major chemical components of the materials treated as herein provided vary over significant ranges. Thus, the major components are elemental iron which may vary from about 10 to about 60 percent by weight of the material, and mixtures of $Fe_2O_3$ and $Fe_3O_4$, which vary in a compensating manner. Minor components, three of which are known to be secondary nutrients, namely Ca, Mg and S and micronutrients, which include Si, Mn, Al, Cr, Cu, Ni, Zn, Zr, Mo, Ti, Sn, Na, K, B, Co, V and others are present. The relative proportions of these are likewise variable. Yet, an unexpected and relatively constant high degree of beneficiation of iron deficient soil results from use of fixed dosages, even very small dosages, of these materials. It is also probable that particulars of the manufacturing operation results in a particular spectrum of physical size, form and chemical activity of the various components, which relate to the beneficial effect produced by these materials.

Under the circumstances set forth above, it appears that the best description and identification of the agents of this invention is an account of the manner in which the agents are manufactured from particular raw materials. A flow diagram of the process is shown in FIG. 1. The raw materials are gray cast iron chips from particular commercial sources, as for example, from machine shops. In this context the word "chips" refers to the small random residue formed in cast iron processing operations and, as such, are of a size generally considerably smaller than the primary cast iron and of a formless nature totally unsuited for the purpose of the primary casting. Such chips commonly constitute the by-product of machining operations. While the precise size of the chips is not a critical factor of the invention, such chips will generally be of a size within the range of 4 to 12 mesh although chips either smaller or larger may also be employed. As a residue or by-product material, the cast iron chips of this invention will often be collected or gathered in machine shops or industrial factories as scrap material mixed with debris of various kinds such as wood and other metallic scraps. The chips will also be wetted with oil and other combustible materials. Removal of debris is effected by dumping the chips on a ¾-inch mesh vibrating screen, know in the art as a "scalping screen." The debris, consisting of rags, wood, large pieces of aluminum and the like is removed to a "scalping" container and discarded. The chips then are passed through a rotary kiln to remove oil and other combustible matter. Residence time in the kiln is dependent upon the oil content of the chips, but usually will not exceed 10 minutes. The condition is imposed that the treated chips show substantially a zero oil content. This is done by an acceptance specification on the incoming chips that they shall have a specified minimal amount of oil as determined by a solvent extraction, and by prior experience which shows that when such chips are exposed to the kiln conditions specified below, substantially all the oil will be removed. Temperatures within the kiln will also vary with the oil content of the chips and will range from about 700° to about 1200° F. When the hot chips emerge from the kiln, they pass through a quenching zone where they are sprayed with water and their temperature is reduced to the range of about 140° to about 250° F. All chemically uncombined water is converted to steam or water vapor and intermixes with other kiln gases. This mixture contains suspended fine ferruginous particles which subsequently are washed out by means of a water curtain and recovered. The suspended solid matter contained in the resulting slurry is one example of the material of the present invention. Its composition is as follows:

| Component: | Percent by weight |
|---|---|
| Elemental iron | <1 to 25 |
| Total equivalent $Fe_2O_3$ [1] | 25 to 75 |
| Acid-insoluble matter | 10 to 25 |
| Other, including micronutrients | 0 to 10 |

[1] Includes elemental iron.

Meanwhile, the dry, now blue-black iron chips are elevated to sizing screens and the finer fractions are directly diverted to classifier screens. Material greater in size than 10 mesh goes to an appropriate conventional grinding mill, the output of which returns to the classifier screens. This cycling continues until all the chips are reduced to various particle sizes that will pass a 10-mesh sieve as, for example, to a size gradation such that they may be classified into 30, 60 and 90 mesh sizes. There are collectors of fine particles over the four classifying screens. The fine material is removed by rapidly-moving air. That portion of it which is coarse enough settles in a cyclone collector and is a second example of a suitable material of this invention. The collectors are of the commercial type known as Buell collectors. Essentially 100 percent of this material will pass a No. 100 U.S. screen and its composition is as follows:

| Component: | Percent by weight |
|---|---|
| Elemental iron | 25 to 75 |
| Total equivalent $Fe_2O_3$ [1] | 75 to 110 |
| Acid-insoluble matter | 5 to 15 |
| Other, including other micronutrients | 0 to 10 |

[1] Includes elemental iron.

That portion of the fine material which is too fine to settle in the cyclone collector, is subsequently trapped in a cloth filter collector of conventional type. It is so exceedingly fine that over 95 percent by weight passes a U.S. No. 325 screen. However, the precise proportion having this sieve size is a function of the cloth filter chosen and is not critical. A greater or lesser proportion of particles of this size would also be within the scope of this invention. This material is rich in $Fe_3O_4$ and its composition is as follows:

| Component: | Percent by weight |
|---|---|
| Elemental iron | <1 to 50 |
| Total equivalent $Fe_2O_3$ [1] | 50 to 90 |
| Acid-insoluble matter | 5 to 20 |
| Other, including micronutrients | 0 to 10 |

[1] Includes elemental iron.

It is a third example of a suitable material of this invention.

In convenient commercial embodiments, the total amount of fine material of all the types described generally represents only a very small proportion of the input cast iron chips. The actual physical means of collecting the fine material and the precise particle size ranges which depend on it is not critical and other means than those described above may be employed.

Materials of this invention were evaluated in soil samples obtained in the western portion of Texas, representing those areas where iron is very unavailable to plants because of the alkalinity of the soil, and the nature of the subsoil formations, which in turn, are related to sparse rain fall. Only soil which would induce a moderate or an extreme iron chlorosis in plants was utilized. The plants employed were confined to sorghum and soybeans, although many others would also be subject to iron chlorosis in these soils. These particular plants were chosen because they are known to researchers in the field as good "indicator crops," which means that they will respond so strongly to iron-deficient soil that ambiguity of experimental results is minimized. Quantitative data showing the degree of beneficiation of soil by material of this invention was obtained using only sorghum plants.

In comparative experiments, effects of one example of finely divided ferruginous material of the present invention, namely, that collected in the cyclone collector, was compared to effects of equal dosages of an excellent, commercial horticultural iron concentrate. This control consisted of finely divided elemental iron, $Fe_2O_3$, and a woody, organic material. The active inorganic ingredients consisted of about 13 percent by weight elemental iron and about 12 percent by weight $Fe_2O_3$. This is a representative sample of the most widely accepted product that is used for purposes provided by material of this invention.

In experiments related to one intended use as an additive to soil for potted plants, the finely-divided material of the present invention and the control material described above were interblended with the soil at the rate of 1 tablespoon per pot, which was equivalent to 17,400 kilograms per hectare. This dosage is so great in relation to the actual needs of the plants that differences in proportions of iron or iron oxides in the materials being compared is not a critical factor. The dosage unit is a convenient unit approximately equal numerically to pounds per acre. In these tests, two different kinds of soil were used, namely, soil showing a severe deficiency of available iron designated "iron-deficient soil" in the tables which follow, and a soil having a marginal iron deficiency, designated "marginal soil" in the tables below. The two different kinds of soil used in these experiments were previously mixed with a phosphate and a nitrate in such proportions as to add to the soil the equivalent of 100 pounds per acre of $P_2O_5$ and elemental nitrogen. The purpose of this treatment was to insure that a deficiency of these vital nutrients would not be a limiting factor and that poor plant growth could be associated unambiguously with iron deficiency.

The finely divided ferruginous material employed in these tests contained approximately 30 percent elemental iron by weight and 54 percent iron oxide by weight. The ferruginous material was used as the principal ingredient (more than 99 percent by weight) of each of four mixtures in which the components were proportioned as follows:

| | Percent by weight for mixtures No. | | | |
|---|---|---|---|---|
| | 1 | 2 | 3 | 4 |
| Ferruginous material | 99.10 | 99.35 | 99.40 | 99.65 |
| Calcium lignosulfonate | 0.30 | 0.30 | 0.00 | 0.00 |
| Sodium glucoheptonate | 0.50 | 0.25 | 0.50 | 0.25 |
| Dye | 0.10 | 0.10 | 0.10 | 0.10 |
| Perfume | Trace | Trace | Trace | Trace |

The dye and perfume were added for cosmetic reasons only and their identities are immaterial. The formulations were designed as possible commercial products. The lignosulfonate was intended to function as a dispersing agent, and the glucoheptonate, as an iron chelating agent, to enhance early effect.

The plants grown were sorghum and these were harvested after 8 weeks, to secure the data shown. Results of the tests are summarized below:

| Soil type | Soil addition | No. of plants | Plant yield, wt. in grams oven-dry basis |
|---|---|---|---|
| Iron-deficient | None | 6 | 5.54 |
| Do | Mixture No. 1 | 7 | 15.87 |
| Do | Mixture No. 2 | 8 | 16.71 |
| Do | Mixture No. 3 | 8 | 15.37 |
| Do | Mixture No. 4 | 8 | 18.17 |
| Do | Control | 8 | 12.62 |
| Marginal | None | 7 | 9.70 |
| Do | Mixture No. 1 | 7 | 18.65 |
| Do | Mixture No. 2 | 8 | 16.33 |
| Do | Mixture No. 3 | 8 | 17.49 |
| Do | Mixture No. 4 | 8 | 17.03 |
| Do | Control | 8 | 11.49 |

It is apparent from the data above, comparing results with Mixture No. 3 and No. 4 with those for No. 1 and No. 2, that the dispersing agent is not a contributing factor.

Visually, plants grown in the soil having no iron addition were very yellow and chlorotic, whereas those grown in soil to which the ferruginous mixtures had been added were healthy and green. Those grown in soil to which the commercial control had been added were intermediate in appearance.

Subsequently, a second generation of sorghum plants was grown in the same soils, in order to determine how long the beneficial effects of the ferruginous material and of the commercial control product would persist. The experimental conditions were the same as those described above.

Test results are summarized as follows:

| Soil type | Soil addition | Total yield, wt. in grams | |
|---|---|---|---|
| | | Green | Dried |
| Iron-deficient | None | 39.35 | 4.50 |
| Do | Mixture No. 1 | 63.08 | 8.84 |
| Do | Mixture No. 2 | 51.99 | 6.12 |
| Do | Mixture No. 3 | 58.86 | 7.29 |
| Do | Mixture No. 4 | 74.92 | 8.92 |
| Do | Control | 24.32 | 2.54 |
| Marginal | None | 33.28 | 4.08 |
| Do | Mixture No. 1 | 70.11 | 8.71 |
| Do | Mixture No. 2 | 52.17 | 6.19 |
| Do | Mixture No. 3 | 34.30 | 4.09 |
| Do | Mixture No. 4 | 44.06 | 5.16 |
| Do | Control | 34.05 | 4.02 |

It is apparent from the data above that the ferruginous mixtures of this invention continue to impart benefits to the second crop of plants to a significantly greater extent than does the commercial control material.

A second set of experiments repeating the above, yielded results as follows:

| Soil type | Soil addition | No. of plants | Average plant height, inches | Avg. yield, wt. in grams | |
|---|---|---|---|---|---|
| | | | | Green | Dried |
| Iron-deficient | None | 5 | 21 | 4.76 | 1.08 |
| Do | Mixture No. 1 | 5 | 25 | 5.86 | 1.57 |
| Do | Mixture No. 2 | 5 | 27 | 7.39 | 2.07 |
| Do | Mixture No. 3 | 5 | 26 | 6.58 | 1.72 |
| Do | Mixture No. 4 | 5 | 27 | 12.79 | 3.55 |
| Do | Control | 1 | 18 | 2.70 | 0.12 |
| Marginal | None | 4 | 17 | 3.15 | 0.65 |
| Do | Mixture No. 1 | 5 | 24 | 5.03 | 1.63 |
| Do | Mixture No. 2 | 6 | 29 | 12.17 | 3.57 |
| Do | Mixture No. 3 | 5 | 21 | 3.73 | 0.89 |
| Do | Mixture No. 4 | 5 | 26 | 7.92 | 2.17 |
| Do | Control | 5 | 24 | 5.64 | 1.49 |

The above data again demonstrate the superiority of the ferruginous mixtures in this context.

In another approach to evaluating the finely-divided ferruginous material of the present invention, the conditions described above were maintained, except that the treatment agents were not added until after plants showing a strong iron chlorotic condition had developed. Then, the agents were added in the same dosage as before to the top of the soil, and were mixed into the immediate subsurface soil to the extent that was feasible without disturbing the root system of the plants.

Results as follows were obtained:

| Soil type | Soil surface addition | Total yield, wt. in grams | |
|---|---|---|---|
| | | Green | Dried |
| Iron-deficient | None | 39.35 | 4.50 |
| Do | Mixture No. 1 | 65.44 | 8.28 |
| Do | Control | 20.76 | 2.76 |
| Marginal | None | 33.28 | 4.08 |
| Do | Mixture No. 1 | 41.17 | 4.72 |
| Do | Control | 26.64 | 3.43 |

The experiments described contain what may appear to be an ambiguity in that the finely-divided ferruginous material of the present invention was empolyed as mixtures containing minor proportions of other components. Accordingly, other experiments were conducted under the same conditions as described above and also employed the good indicator crop sorghum, except that the ferruginous material was employed as such, with no additions whatever. In this case, the treatment agents were applied to the surface of the soil containing plants already showing a severe chlorotic condition, in the manner described above.

Results as follows were obtained:

| Soil type | Soil addition | Total yield, wt. in grams | |
|---|---|---|---|
| | | Green | Dried |
| Iron-deficient | None | 25.95 | 3.10 |
| Do | Mixture No. 4 | 82.91 | 10.07 |
| Do | Ferruginous material only | 84.50 | 9.05 |
| Do | Control | 51.20 | 5.78 |

| Soil type | Soil addition | Average yield, wt. in grams, oven-dry basis |
|---|---|---|
| Iron-deficient | None | 12.93 |
| Do | Control | 13.37 |
| Do | Fine material from cyclone collector No. 1 | 17.52 |
| Do | Fine material from cyclone collector No. 2 | 18.05 |
| Do | Fine material from cyclone collector No. 3 | 20.14 |
| Do | Fine material from cloth filter collector | 21.78 |
| Do | Fine material from water slurry collector No. 1 | 20.77 |
| Do | Fine material from water slurry collector No. 2 | 18.78 |
| Do | Fine material from water slurry collector No. 3 | 19.75 |
| Do | Fine material from water slurry collector No. 4 | 18.09 |

The above data demonstrate that the virtues of the ferruginous fine materials do not depend on source or means of collection.

A set of similar experiments was conducted to determine the effective dosage range of the ferruginous fine material as such, with no additions, and having been intermixed with the soil in the flower pots prior to growth of sorghum. A soil having an extreme deficiency of available iron was used in this case. Results were judged in terms of color improvement in a qualitative 10-point scale, as well as in terms of plant yield. Results were obtained as follows:

| Dosage, kg. per hectare | Color index | Average yield, wt. in grams, oven-dry basis |
|---|---|---|
| 0 | 1 | 12.93 |
| 1 | 1 | 15.56 |
| 10 | 1 | 15.37 |
| 100 | 6 | 18.08 |
| 500 | 6 | 19.13 |
| 1,000 | 8 | 16.03 |
| 17,405 | 9 | 14.79 |

The above data show beneficial improvements effected by the materials of this invention most notably in the range of 10 to 100 kg. per hectare dosage, but also at the higher rates of use.

What is claimed is:

1. A process for treating plant-bearing soil by the addition of a ferruginous material to prevent or overcome an iron deficiency in said soil and iron chlorosis in plants growing therein comprising adding to said soil a finely divided material prepared by heating cast iron chips to a temperature on the order of 700° F. to about 1200° F. and quenching in water, whereby a very significant beneficiation of the treated plant-bearing soil is achieved, substantially obviating the existence or likelihood of iron deficiency in the plants growing therein.

2. The process of claim 1, wherein said finely-divided ferruginous material is quenched after heating, by means of water, so that the temperature of said chips is in the range of about 140° F. to about 250° F.

3. The process of claim 1, in which said cast iron chips comprise the residue of cast iron processing operations.

4. The process of claim 3, in which said chips comprise the by-product of machining operations.

5. The process of claim 1, in which said material from said chips is added to the soil in a small, effective dosage.

6. The process of claim 5, in which said material from said chips is added in a dosage of from about 1 to about 17,400 kilograms per hectare.

7. The process of claim 6, in which said dosage is from about 10 to about 100 kilograms per hectare.

8. The process of claim 1, in which said pre-treated finely divided material from said cast iron comprises material passing a No. 100 U.S. screen.

9. The process of claim 8, in which said finely divided material comprises material having an elemental iron content of from about 25% to about 75% by weight of said finely divided material.

10. The process of claim 1, in which said pre-treated, finely divided material comprises material passing a No. 325 U.S. screen.

11. The process of claim 10, in which said finely divided material has an elemental iron content of less than about 50% by weight of said material and a total equivalent $Fe_2O_3$ content including elemental iron of from about 50% to about 90% by weight.

12. The process of claim 1, in which said quench water is converted to steam in the quenching zone and passes therefrom with very finely divided ferruginous material suspended therein and including the recovery of said finely divided material therefrom for use as said finely divided material in plant-bearing soil.

13. The process of claim 12, in which said very finely divided material is recovered by contacting said fines bearing stream with water to wash out said fines.

14. The process of claim 13, in which said finely divided material has an elemental iron content of less than about 25% by weight thereof and a total equivalent $Fe_2O_3$ of from about 25% to 75% by weight thereof.

15. The process of claim 8, in which the quenched cast iron chips are classified into −10 mesh material and +10 mesh material, said −10 mesh material passing to classifying screens in which said finely divided material is separated from the body of said quenched cast iron chips.

References Cited

UNITED STATES PATENTS

| 2,741,876 | 4/1956  | Paolini | 71—1 X |
| 2,816,396 | 12/1957 | Ross    | 71—1 X |
| 3,027,249 | 3/1962  | Jost    | 71—1   |

FOREIGN PATENTS

| 1,065,802 | 9/1959 | Germany | 71—1 |

REUBEN FRIEDMAN, Primary Examiner

R. B. BANES, Assistant Examiner